Patented Nov. 21, 1933

1,936,070

UNITED STATES PATENT OFFICE 1,936,070

PROCESS FOR THE MANUFACTURE OF POTASSIUM SULPHATE

Charles F. Ritchie and Grant E. Warren, Trona, Calif., assignors to American Potash & Chemical Corporation, Trona, Calif., a corporation of Delaware No Drawing. Application March 11, 1931
Serial No. 521,881

15 Claims. (Cl. 23—121)

This invention relates to a process for manufacturing by crystallizing from solution potassium sulphate and refers particularly to the production of potassium sulphate from potassium chloride and sodium sulphate or mixtures or reaction products thereof.

When potassium chloride and sodium sulphate are reacted according to the equation:

$$2KCl + Na_2SO_4 = K_2SO_4 + 2NaCl,$$

and an attempt is made to precipitate potassium sulphate instead of obtaining potassium sulphate a mixed crystal or double salt of sodium sulphate and potassium sulphate known as "glaserite" is produced.

Glaserite is produced in accordance with the following equation:

$$4Na_2SO_4 + 6KCl = K_6Na_2(SO_4)_4 + 6NaCl.$$

Glaserite has a lower solubility than either of its component parts, i. e. sodium sulphate or potassium sulphate and is invariably precipitated from solution when appreciable quantities of sodium ions are present with potassium and sulphate ions.

One of the objects of the present invention is to provide a process for producing potassium sulphate from glaserite whether the glaserite is produced according to the aforesaid equation or whether it is available as a by-product from some other process of manufacture.

It is a further object of the present invention to provide a process of manufacturing potassium sulphate from impure reagents in such a manner that the resulting potassium sulphate will be essentially pure. The present invention is useful as applied to a wide variety of raw materials, existing either as solids, in solution, in pure form, or contaminated.

The present invention together with various further objects and advantages thereof will best be understood from a description of a preferred form or example of a process embodying the invention. For this purpose we have hereafter described an example of the invention in its preferred form.

In its preferred form the invention may be described as a process carried out in two major steps embodying two different reactions. In the first step of the process we combine sodium sulphate and potassium chloride or materials containing these ingredients together in solution in accordance with the equation:

$$4Na_2SO_4 + 6KCl = K_6Na_2(SO_4)_4 + 6NaCl$$

During the reaction or subsequent thereto the conditions of temperature and concentration of the solution are adjusted to cause the precipitation of the glaserite formed, leaving the sodium chloride in solution.

As the second major step of the process we combine the glaserite precipitated from the first step with additional potassium chloride under conditions to cause potassium sulphate to be produced and precipitated from the solution in accordance with the following equation:

$$K_6Na_2(SO_4)_4 + 2KCl = 4K_2SO_4 + 2NaCl$$

The first step of the process, i. e. that of producing glaserite may be carried out in any usual or well-known manner or where the glaserite is already available as a by-product of some other process, this glaserite may be used and the first step dispensed with. In many cases the double salt glaserite is obtained through the concentration of certain saline solutions containing potassium, sodium and sulphate ions. In fact, under many conditions, it is almost impossible to avoid the formation and precipitation of glaserite.

When, however, it is desired to manufacture glaserite for the process from potassium chloride and sodium sulphate the efficiency of the process depends upon using such proportions of potassium chloride, sodium sulphate and water as will produce an end liquor after the precipitation of glaserite which is virtually saturated with sodium chloride and sodium sulphate.

The proportions of sodium sulphate, potassium chloride and water to be employed for producing this result are dependent upon the temperature employed in the process. For example, to produce five tons of glaserite (Na_2SO_4.3K_2SO_4) we mix 10,890 pounds of essentially pure sodium sulphate with 2240 gallons of water.

All of the sodium sulphate does not entirely dissolve in the water at 20° C. but remains partially as a sludge. We then add 8150 pounds of essentially pure potassium chloride and agitate the mixture thoroughly at 20° C. for sufficient time to cause the conversion to become complete, usually several hours being necessary. Finely divided reagents are preferred for this purpose because neither reagent employed will dissolve completely in pure water and the reaction is one of solid conversion or digestion. That is, we use both more sodium sulphate and more potassium chloride than is necessary to saturate the solution with either of such salts and the reaction proceeds with a partial solution of the sodium sulphate and potassium chloride with partial precipitation of glaserite and further solution of sodium sulphate and potassium chloride until complete reaction is obtained. If sufficient water were employed to immediately effect entire solution of all of the sodium sulphate and potassium chloride, the resulting yield of glaserite would be low. Finely divided reagents are preferred for the process because of the fact that a solid conversion or digestion process of this kind is dependent upon the solid materials being readily dissolved.

By the process thus described about 10,000 pounds of glaserite containing about 7860 pounds of $K_2SO_4$ are produced at a recovery efficiency based upon the available potassium employed of about 83%.

Somewhat greater efficiencies may be produced at lower temperatures by modifying the proportions of sodium sulphate, potassium chloride and water used. However, the rate of solution of the material at the lower temperatures is less and the process requires a longer period for its completion. Higher temperatures may be used and a more rapid reaction secured but a less efficient recovery of glaserite obtained.

The glaserite thus produced contains about 78.6% potassium sulphate or 42.5% $K_2O$. Potassium salts are mostly desirable for fertilizer. Pure potassium sulphate contains about 54.0% $K_2O$ and salts sold as potassium sulphate usually contain 48% $K_2O$ or at least 90% $K_2SO_4$. By the process of the present invention we may refine the glaserite produced in accordance with the foregoing operations in order to obtain a highly pure potassium sulphate. One manner of accomplishing this comprises the simple digesting of glaserite with sufficient water to hold the undesirable sodium salts in solution while precipitating out potassium sulphate. For example, to 2160 gallons of water at 35° C. may be added 6100 pounds of essentially pure glaserite containing about 4790 pounds $K_2SO_4$ and the mixture stirred and allowed to digest for several hours. Upon completion of the operation a resulting sludge is produced which may be separated from the mother liquor and consists of about 2100 pounds of pure potassium sulphate.

The efficiency of potassium sulphate recovery in this manner is comparatively low. Preferably, in the second stage of the process we digest glaserite and pure potassium chloride together in suitable proportions of glaserite, potassium chloride and water to secure a solid conversion of the glaserite and potassium chloride into potassium sulphate. The solution resulting after the precipitation of the potassium sulphate is preferably saturated with potassium chloride, potassium sulphate and glaserite. For example, when conducting the reaction at 35° C. 10,440 pounds of glaserite containing about 8200 pounds of $K_2SO_4$ are placed in a suitable agitator containing about 2160 gallons of water. To this mixture is added 7610 pounds of KCl and the heavy sludge thoroughly agitated until the conversion is complete, usually requiring about three hours. Upon completion of the digesting operation the resulting sludge of crystals is separated from the solution in a suitable manner such as by the use of centrifugal machines, and is washed to displace adhering mother liquor. The solid salt so obtained comprises approximately 10,370 pounds of essentially pure $K_2SO_4$ (potassium sulphate).

The mother liquor remaining after the digestion operation had the following percentage composition:

|  | Per cent |
|---|---|
| NaCl | 5.67 |
| KCl | 22.43 |
| $Na_2SO_4$ | 1.82 |
| $H_2O$ | 70.08 |
| Total | 100.00 |

The molecular or chemical reaction occurring in the above digestion of glaserite with potassium chloride and water for the production of potassium sulphate may be most accurately expressed as follows:

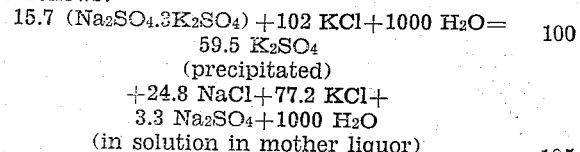

$$15.7\ (Na_2SO_4.3K_2SO_4) + 102\ KCl + 1000\ H_2O =$$
$$59.5\ K_2SO_4$$
(precipitated)
$$+ 24.8\ NaCl + 77.2\ KCl +$$
$$3.3\ Na_2SO_4 + 1000\ H_2O$$
(in solution in mother liquor)

From the foregoing equation it will be seen that the potassium sulphate of the glaserite (47.1 mols) and that formed by reaction of potassium chloride with sodium sulphate is seen to be precipitated, while the sodium chloride produced is held in solution, together with certain residual concentrations of sodium sulphate and potassium chloride. A large part of the latter may be recovered by a further step of the process of the present invention.

The purity of the potassium sulphate recovered with respect to undesirable sodium salt is determined by the above noted molar and percentage composition of the end liquor. When the digestion is carried out at 35° C. the proportions of glaserite, potassium chloride and water used should be those which will produce this resulting mother liquor after the precipitation of the potassium chloride. If an attempt is made to exceed these values with respect to sodium chloride and sodium sulphate, the resulting crop of potassium sulphate will be impure.

The quantity of KCl indicated for use depends upon yield recovery efficiency of potassium and the purity of the product desired. As previously shown, potassium sulphate may be produced from glaserite either with or without the addition of potassium chloride to the digesting mixture. It is preferred that KCl be employed, for the yield per batch as well as the recovery efficiency of potassium are thereby increased, as compared on the basis of the pure product, $K_2SO_4$, obtained. If an impure product may be tolerated then an excess of glaserite may be introduced into the digestion, which in effect amounts to nothing more than mixing glaserite with the potassium sulphate produced. In other words, if the purity of the product is not paramount, less care may be exercised in maintaining the sodium salts in solution in the mother liquor.

The liquor from which the potassium sulfate was produced in Example 3 was saturated with KCl. While it is not especially desirable to contaminate the potassium sulphate produced with potassium chloride, in commercial practice attempt is made to reach this point of saturation and to this end, it is often desirable to insure the desired concentration by maintaining the KCl added to the digestion in slight excess.

Impurities comprising sodium salts (NaCl or $Na_2SO_4$) appearing in the reagents employed are to be avoided if possible, for such impurities decrease the yield obtainable from a given size of bath as well as the efficiency of this step of the process. For example, when the KCl employed in the above digestion step at 35° C. contains 8% NaCl as an impurity, then only 7440 pounds of the impure KCl can be added to 7050 pounds of glaserite in the specified 2160 gallons of water, producing only about 6800 pounds of pure potassium sulphate and materially decreasing the efficiency of this step of the present invention. The analysis of the mother liquor produced is, of course, the same as that obtained in previous examples.

Likewise excess sodium sulphate in the glaserite employed is not desirable. A glaserite containing 6.2% excess $Na_2SO_4$ over that indicated by the aforementioned formula demands that only 8500 pounds of the impure glaserite, containing about 6270 pounds $K_2SO_4$, be treated with 7610 pounds of KCl in the specified 2160 gallons of water, thereby producing 8430 pounds of potassium sulphate; which is materially less than recovered in the first example, employing essentially pure materials and the recovery efficiency of the step is lowered.

The temperature at which the digestion step for the production of potassium sulphate from glaserite is carried out is relatively unimportant and this is especially true when the full cyclical process of this invention is employed, wherein the potash in the mother liquors above noted is to a large extent recovered for further use. In this case the overall efficiency of the entire process does not vary materially through the ordinary range of "room" temperatures, e. g., from 15° C. to 40° C., and the process may be carried out in its entirety at whatever temperature is most convenient and economical. We have found that the first step of the process as set forth above may be conducted or at least completed with increased efficiency of potash at very low temperatures, e. g. at 0° C.

However, at low temperatures the digestion process is slow and the cost of refrigeration is usually high, thereby militating against carrying out the process in this neighborhood. When the process, as a whole, is to be made cyclical and self-sustaining, as hereinbelow described, working of the first step at low temperatures constitutes a distinct disadvantage.

It is preferred to conduct the process of this invention at ordinary "room" or atmospheric temperatures. With change of temperatures, as with change of impurities in the raw materials, the proportions of reagents employed in the first step of the process, for the production of potassium sulphate from glaserite must be varied somewhat. As previously shown the composition of the mother liquor, that is to say, the amount of sodium salts it will hold, is the most vital determining or limiting factor in the production of pure potassium sulphate from glaserite by digestion. The following is a tabulation of the composition of this mother liquor at various temperatures found to allow of the production of pure potassium sulphate from glaserite. From these data one skilled in the art may readily determine the relative proportions of the various reagents to be employed in the first step of the process of this invention, in cases where conditions are found to vary from those set forth in the examples.

*Percentage composition of $K_2SO_4$ mother liquor*

| Temperature °C. | 0°* | 0°** | 20 | 25 | 35 | 39 | 50 |
|---|---|---|---|---|---|---|---|
| Per cent NaCl | 5.95 | 9.5 | 5.89 | 5.85 | 5.67 | 5.77 | 5.90 |
| Per cent $Na_2SO_4$ | 3.77 | 1.7 | 1.71 | 1.70 | 1.82 | 1.65 | 1.55 |
| Per cent KCl | 10.55 | 13.4 | 19.82 | 20.86 | 22.43 | 23.00 | 24.70 |
| Per cent $H_2O$ | 79.73 | 75.4 | 72.58 | 71.59 | 70.08 | 69.58 | 67.85 |
| Per cent, total | 100.00 | 100.00 | 100.00 | 100.00 | 100.00 | 100.00 | 100.00 |

\* When liquor saturated with Glauber salt.
\*\* When liquor saturated with potassium chloride.

Having thus described the general methods of the present invention for converting glaserite to potassium sulphate, the next step embraces the recovery of a portion of the potash values remaining in the mother liquor and the production of a certain amount of glaserite for use in the first digestion step, for the production of potassium sulphate. There are several variations to this recovery step, all based upon the further addition of sodium salts either with or without further additions of potassium chloride, to said mother liquor. Varying quantities of potash salts are so recovered, according to the type of and quantity of salt employed and the quantity and variety of potash salt being desired.

For example, the mother liquor from the foregoing potassium sulphate step at 35° C., containing about 5.67% NaCl, 1.82% $Na_2SO_4$ and 22.43% KCl may be treated with sodium chloride and sodium sulphate for the precipitation of pure potassium chloride, KCl. To this end, to said end liquor we added about 3300 pounds of impure sodium chloride, containing about 3660 pounds sodium chloride, the remainder being largely sodium sulphate, and stirred the mixture for several hours at 20° C. until the digestion was complete. By these means about 3000 pounds of essentially pure potassium chloride are precipitated which may be recovered from the liquor by means of a centrifugal machine or other suitable equipment. The resulting KCl so recovered may then be employed for the manufacture of glaserite as described hereinbefore.

The production of glaserite comprises digesting potassium chloride with sodium sulphate in a limited quantity of water, said quantity of water usually being insufficient for the complete dissolution of either solid reagent, at the temperature employed. In order to save the labor of first producing and removing potassium chloride from the potassium sulphate mother liquor and subsequently reacting the same with sodium sulphate for the production of glaserite, we have found it advantageous to combine the operation by adding the requisite ingredients directly to the potassium sulphate mother liquor, thereby considerably simplifying this step of the process and producing the glaserite with less expenditure of time and energy.

To this end for example, we may add to the foregoing potassium sulphate mother liquor at 35° C. about 610 pounds of sodium chloride and 6550 pounds of sodium sulphate, the water already in the mother liquor being analogous to that added in the original example, for the production of glaserite. The sludge is thoroughly agitated at 35° C. for several hours—until the digestion is complete—and the resulting solid removed by means of a centrifugal or other suitable equipment. By these means there are recovered about 6000 pounds of glaserite, suitable for use in the potassium sulphate digestion step hereinbefore described. This quantity of glaserite, so recovered, amounts to about 57% of that which was employed in the preferred form of the potassium sulphate digestion step of the process, at 35° C., described in previous examples. Under certain conditions (involving the raw materials at hand) the quantity of glaserite recovered by such means is sufficient for the efficient continual cyclical operation of the process of this invention, and no attempt is made to produce further quantities of glaserite synthetically, i. e., by the use of potassium chloride.

However, it has been found that even a greater quantity of glaserite may be produced from the potassium sulphate mother liquor, if so desired, by replacing the sodium chloride employed with an equivalent molecular quantity of potassium chloride. To this end, we add to the mother liquor from the potassium sulphate digestion step 35° C. about 775 pounds of potassium chloride and 7535 pounds of sodium sulphate and digest the sludge at 35° C. as in the foregoing example. By these means there are produced about 7150 pounds of glaserite, or about 68% of the total glaserite employed in the original potassium sulphate digestion step at 35° C., Example 1. The recovery efficiency based upon potash ($K_2O$) introduced into the potassium sulphate step and either of these two glaserite production steps forming a semi-cyclical process, is the same—about 84% recovery efficiency. The only difference between the two recovery steps resides in the quantity of glaserite returned to the first step of the process—the quantity of glaserite desired indicating whether potassium chloride shall be employed in the second (glaserite) step.

If a quantity of glaserite, equal to that employed in the first (potassium sulphate) step, is desired and the same is not available from other sources or is not produced in sufficient quantity by the above recovery step, then some glaserite must be manufactured synthetically from KCl and $Na_2SO_4$ as per the conditions first set forth in this description. Otherwise stated, if the desire of the manufacturer is to produce potassium sulphate entirely from potassium chloride and sodium sulphate—both essentially pure—then a certain amount of glaserite must be manufactured synthetically in order to maintain the complete cycle under constant operating conditions. It has already been shown how the desired quantity of glaserite may be manufactured synthetically from the essentially pure reagents and water.

However, in the operation of a continuous cyclical process, we have found it advantageous to combine this production of the glaserite required to make the cyclical process self-sustaining, with the step of recovering the residual potash values from the potassium sulphate end liquor, thereby saving an extra process step but unfortunately adding nothing to the efficiency of the process, over that of making the glaserite separately and adding the same to the glaserite evolved in either of the foregoing recovery steps, which may be done if desired. To the end of producing glaserite from the potassium sulphate mothed liquor, KCl, $Na_2SO_4$, and added water, the following example, is submitted:

To the mother liquor from the potassium sulphate digestion step at 35° C., we add 3570 pounds essentially pure KCl and 10,990 pounds of essentially pure $Na_2SO_4$. The added sodium sulphate is more than sufficient to saturate the solution therewith, and remains as a sludge. We also add about 720 gallons of water and digest the mixture at 35° C. for several hours—until the conversion is complete. The crop of glaserite formed by solid, double-composition between the solid reagents added, may be recovered as before indicated. The resulting crop of glaserite may be given a purging wash with water, if so desired, for displacing the adhering impure mother liquor. In this manner about 10,440 pounds of glaserite are produced, which glaserite is returned to the potassium sulphate digestion step of the process, thereby completing the cycle and providing a balanced or self-sustaining condition. The overall recovery of potash ($K_2O$) in this cyclical process, run at 35° C., is about 80%, the loss of 20% being discarded with the end liquor from the last step—glaserite production. Said end liquor may be further treated by subsequent processes, for the recovery of the values contained.

As in the case of the potassium sulphate digestion step, the composition of the glaserite end liquor is the controlling factor in producing pure glaserite from the ingredients, KCl and $Na_2SO_4$. This end liquor must hold in solution the large quantity of sodium chloride formed by the reaction, together with that added if such course is elected. In fact attempt is usually made to approach saturation with respect to NaCl in the end liquor from which glaserite is produced. Such end liquor will of course contain residual values of KCl and $Na_2SO_4$. As has been previously pointed out, the amount of glaserite needed in the first step of the cyclical process for the production of potassium sulphate may vary considerably under different conditions, and the general principles limiting the conditions of production of glaserite may be set forth (so that one skilled in the art may be able to produce the desired glaserite) by a tabulation of the permissible solubility values of the glaserite end liquors. Whether the glaserite be produced from KCl, $Na_2SO_4$, and water or by treatment of the potassium sulphate mother liquor or by a combination of the two, the controlling factor of the process resides in the composition of the glaserite end liquor, and the overall efficiency of the cyclical process is determined by the efficiency of the glaserite production step.

The efficiency of the glaserite production step does not vary materially over the ordinary range of room or atmospheric temperature, i. e., from 15° to 50° C., and the process may advantageously be conducted at whatever temperature is most convenient within this range. It must be stated, however, that the maximum efficiency is to be obtained at or near the lower of the temperatures mentioned—15° C. However, rate of decomposition decreases with temperature, as above limited, and oftentimes there is little to gain by use of elaborate means to realize the lower temperatures. At higher temperatures, the glaserite end liquor contains more potash values which, if discharged to waste, will somewhat lower the potash recovery efficiency of the process. The limiting or saturation composition of the glaserite end liquor which determines the overall efficiency of the cyclical process as a whole, is set forth below:

*Percentage composition of glaserite end liquor*

| Temp. °C. | 20 | 25 | 35 | 50 |
|---|---|---|---|---|
| Per cent NaCl | 19.07 | 19.11 | 19.45 | 19.53 |
| Per cent Na₂SO₄ | 8.18 | 7.89 | 7.04 | 6.54 |
| Per cent KCl | 5.14 | 5.43 | 6.44 | 7.74 |
| Per cent H₂O | 67.61 | 67.57 | 67.07 | 66.19 |
| Per cent, total | 100.00 | 100.00 | 100.00 | 100.00 |

From the date and the foregoing description of the cyclical process of this invention, one skilled in the art may readily calculate the desired proportions of ingredients to be employed under varying conditions. While in the case of the manufacture of potassium sulphate from pure reagents, KCl and Na₂SO₄, it is generally necessary to add both the same, together with water, to the potassium sulphate mother liquor for the production of sufficient glaserite to maintain the cyclical process under uniform conditions, the presence of impurities, for example, in the KCl employed, may so decrease the glaserite allowable in the first step of the cycle that no water and even no KCl must be added to said mother liquor prior to the production of glaserite.

It was shown that the presence of 8% NaCl in the KCl employed in the potassium sulphate digestion step reduced the quantity of glaserite to be treated in a stated (selected for convenience only) quantity of water from 10,440 pounds to 7050 pounds. Hence, it is axiomatic that only 7050 pounds of glaserite must be produced in following steps of the process to maintain such cyclical system constant. End liquor from this digestion step, having the same composition as that produced when pure reagents were employed, may be further treated with about 760 pounds of the impure KCl, containing about 700 pounds pure KCl, and about 7440 pounds of Na₂SO₄ at 35° C. (but without the further addition of water) in a manner similar to that hereinbefore described. A crop of glaserite may be recovered, weighing about 7050 pounds, which is sufficient to satisfy the original requirement of one of the foregoing examples. End liquor from this process should have a percentage composition identical with that of any end liquor resulting from the production of glaserite at 35° C. from the aforementioned reagents. While the yield of potassium sulphate produced per cycle is reduced by this impurity in the KCl to about 68% of that obtained when pure KCl is employed in the cycle, the overall recovery efficiency, based on the valuable K₂O employed, is reduced only from about 80% (using pure KCl) to about 77–78%. Thus it may be seen that the effect of moderate quantities of extraneous sodium salts in the reagents employed is not to materially reduce the overall recovery efficiency of the cyclical process but rather to reduce the yield per cycle if care is taken to produce a pure product, or to decrease the purity of the product if such care is not taken according to the solubility precepts set forth hereinbefore.

The efficiency of the cyclical process, is as a whole, (when relatively pure materials are employed), dependent solely upon the recovery efficiency of potash from the glaserite producing step, that is to say, the lower the KCl value in the end liquor, the greater the efficiency of the process. It has already been indicated that while this efficiency of the process varies only slightly over ordinary temperature ranges, it is best at the lower room temperatures, 15–20° C., and also that the rate of digestion is better at higher temperatures. To take advantage of these facts the potassium sulphate producing step may be conducted at relatively high temperature, the glaserite digestion step started at said temperature and finally finished at the lower temperature. For example, to about 10,500 pounds of essentially pure glaserite, (as indicated by the theoretical formula) containing about 3250 pounds of K₂SO₄, we add about 7860 pounds of essentially pure KCl, the mixture being made in a suitable agitator or digester containing about 2160 gallons of water. The sludge is digested for 1.5 to 2 hours at about 39° C. with thorough agitation—which is usually sufficient provided the materials employed be in small size particles. Analyses of the end liquor and the solids themselves, from time to time, serve to determine the state of the reaction.

At completion, the liquor should have the proper composition and the solids, when freed from adhering liquor, should show essentially complete conversion. After separation from the mother liquor, as previously described, the resulting crop of potassium sulphate was found to be essentially pure and to weigh about 10,500 pounds. Mother liquor so produced was found to have the following percentage composition:

| | Per cent |
|---|---|
| NaCl | 5.77 |
| Na₂SO₄ | 1.65 |
| KCl | 22.98 |
| H₂O | 69.60 |
| Total | 100.00 |

To this mother liquor, held in a similarly agitated digester, we add about 830 gallons of water and about 11,560 pounds of essentially pure sodium sulphate, which sulphate will only partially dissolve in the mother liquor or in the mother liquor and added water. We also add about 3020 pounds of essentially pure KCl and agitate the mixture for about an hour at the normal temperature. Following this preliminary agitation, the temperature of the mixture may be reduced to about 20° C. and further held at said temperature for about a half hour.

The resulting crop of glaserite may be recovered and separated from the end liquor by suitable means. This crop comprises essentially pure glaserite and weighs, when dry, about 10,500 pounds,—sufficient to continue the first step of the cyclical process. The recovery efficiency of the valuable potash (K₂O) realized by these means is about 83% as compared with about 80% obtained in the combined examples, wherein the end liquor is discharged at about 35° C. It is worthy of note that the recovery efficiency of 83% obtained in this case is at 20° C. is identical with the efficiency obtained in the glaserite producing example, at 20° C., which verifies our previous statements regarding the overall efficiency of the cyclical process of this invention as applied to the production of potassium sulphate from KCl and Na₂SO₄. End liquor from this process, at 20° C., was found to have the following percentage composition:

| | Per cent |
|---|---|
| NaCl | 19.09 |
| Na₂SO₄ | 8.15 |
| KCl | 5.15 |
| H₂O | 67.61 |
| Total | 100.00 |

This analysis checks, within the limits of analytical error, the value presented above for the permissible composition of glaserite end liquor at 20° C.

Thus far, greatest stress has been placed upon the conservation of potash. Sodium sulphate, while a relatively cheap and abundant product, is oftentimes of commercial value and should likewise be employed as economically and efficiently as possible. In the foregoing examples of the process of the present invention, the use of essentially pure anhydrous sodium sulphate has been indicated and, while such may be required in certain instances, certain substitutions may be made at times to advantage. For instance where both water and sodium sulphate are indicated in the process step, either all or a part of said water may be supplied to said step by the use of Glauber salt.

Another variation of the process of this invention resides in the use of an impure sodium sulphate. During the evaporation of many natural saline brines, or for that matter almost any sodium carbonate-sodium sulphate, etc.—water, system there is precipitated a double salt of sodium sulphate and sodium carbonate which may have the composition, for instance:

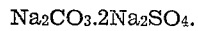

$$Na_2CO_3 \cdot 2Na_2SO_4.$$

While this or similar sulphate-carbonate double salts may be refined to their component constituents, such refining involves certain costs and equipment and means for doing so are not always at hand. Hence, in many instances it is advantageous to employ such double salt, in whole or in part, in place of the pure sodium sulphate employed in the foregoing process steps. For example, to the mother liquor we add about 1000 gallons of water and about 4000 pounds of the double salt of sodium carbonate and sodium sulphate, said double salt containing about 2915 pounds of $Na_2SO_4$. The double salt may be advantageously added to the required water first, if such procedure is practicable and convenient, thereby decomposing the same, and liberating its sodium sulphate for the work of forming glaserite, upon adding thereto the aforementioned mother liquor. We also add to the mixture in the agitator or digester about 3725 pounds of essentialy pure KCl and about 8270 pounds of $Na_2SO_4$. This additional sodium sulphate may comprise the pure anhydrous salt, or a part of the anhydrous salt may be replaced with Glauber salt, thus lessening the water added to the process. For instance, a maximum of about 6550 pounds of the 8270 pounds of pure $Na_2SO_4$ added may be replaced with about 14,860 pounds of Glauber salt.

The resulting mixture is digested at 35° C. for complete conversion of the several solid components to glaserite, and the dissolution of certain values not required in said glaserite, then separated from the end liquor in any satisfactory manner, for instance, by means of a centrifugal machine. As a result, there is recovered about 10,440 pounds of essentially pure glaserite which is a sufficient quantity thereof for return to the first step of the process for the production of potassium sulphate; thereby establishing a balanced cyclical condition. An overall recovery efficiency of potash ($K_2O$) of about 78% is realized by these means. While very slightly more sodium sulphate was employed in this variation of the process than was employed in previous examples, it may be seen that only about 75 per cent as much pure $Na_2SO_4$ was demanded in the present example, the remainder being derived from the sodium carbonate sulphate double salt. Therefore, this variation may comprise a decided economic advantage in certain instances.

While the present invention has been described in terms of pure or only moderately contaminated reagents, it may also be found useful in certain instances, such as for the production of glaserite from extremely impure materials or solutions or both. In such cases, however, the overall recovery efficiency of the process is materially lowered. Since said recovery efficiency (based on $K_2O$) is largely dependent upon the efficiency of the glaserite producing step. It is understood to be immaterial as to the origin of the impurities and while the present example ascribes the same to certain reagents, they may as well have originated from others or from the water employed. To 2160 gallons of water we add sufficient of the impure double salt of sodium carbonate and sodium sulphate to provide about 1345 pounds $Na_2CO_3$ and 3610 pounds of $Na_2SO_4$. We also add sufficient impure potassium chloride to provide about 2455 pounds of KCl. In so doing, there was introduced, with the several impure reagents, about 3525 pounds of NaCl. After digestion at 20° C. for a prolonged period, a small crop of glaserite, weighing about 1760 pounds was recovered, at an efficiency of something less than 50% on the $K_2O$ employed. While the yield and recovery of such a process is undesirably low, such a scheme may, at times, be advantageously employed in the process of the present invention when very impure products or by-products—otherwise practically valueless—are at hand.

When carbonates are introduced, allowance must be made for their complete dissolution in the end liquor, as well as for the dissolution of the other undesirable salts. As in the case of glaserite end liquor, as above tabulated, there is a limiting composition which must not be exceeded if pure glaserite is to be manufactured for the first step of the process. Compositions of these end liquors are as follows:

*Percentage composition of glaserite end liquors*

| Temp. °C. | 20 | 35 | 50 |
|---|---|---|---|
| Per cent NaCl | 16.38 | 17.57 | 18.06 |
| Per cent $Na_2SO_4$ | 7.73 | 6.93 | 6.40 |
| Per cent KCl | 4.67 | 6.22 | 7.53 |
| Per cent $Na_2CO_3$ | 4.95 | 2.74 | 2.06 |
| Per cent $H_2O$ | 66.27 | 66.54 | 65.95 |
| Per cent—total | 100.00 | 100.00 | 100.00 |

The process of this invention comprises largely digestion of solids in suspension to form, by double decomposition, another solid in suspension. In the case of utilizing the double salt of sodium carbonate and sodium sulphate as a source of sodium sulphate another decomposition is introduced into the system, that of decomposing the double salt into its component parts—one part remaining in solution, the other entering into the reaction to produce glaserite.

Finely divided solids have been found to undergo the desired double decompositions more rapidly and completely than larger size material. Thorough agitation and mixing have likewise been found beneficial.

Another scheme, first practiced in the case of the second (glaserite) step of the process, when the double carbonate-sulphate salt was employed, but advantageous under other conditions and steps of the process of this invention, for obtaining complete reaction of the several solid components, is the one described hereinbelow. This method embraces carrying out the digestion or leach step as a multistage counter current process. As applied to the second step of the process of this invention, we take the mother liquor from the first (potassium sulphate) step of the process and employ the same for treating partially converted glaserite salts, thereby completing their conversion, and insuring the production of a high-potash glaserite salt—fully converted. This once-used end liquor is then completely separated from the solid glaserite, the latter being in shape for the first step (production of potassium sulphate). The separated, slightly spent mother liquor is then employed for treating the added reagents $Na_2SO_4$, KCl, water, etc., as hereinbefore described.

After such treatment said liquor is separated from the solids and the former discarded, as before, while the latter are returned to the fresh mother liquor leaving the first step of the process. By these means fresh mother liquor, high in potash values, is caused to react with impure glaserite, which may contain certain undecomposed sodium sulphate values, undecomposed double salts or low-potash glaserite. In other words, the "driving force" for converting sodium sulphate to glaserite is of higher potential in the virgin mother liquor than in the end liquor obtained in the one-stage glaserite step. Likewise, such procedure insures the most complete reduction of potash in the end liquors, since in this case the "driving force" or "precipitating force" resides in the sodium sulphate employed, which may be maintained in slight excess in the second stage of this counter-current digestion scheme. Likewise, since the complete equilibrium is not reached in one step but rather spread about more advantageously, the time required for the digestion may be considerably shortened. It is advisable, however, to carry on as much glaserite conversion as practicable in the last stage of the counter-current digestion scheme, employing the virgin mother liquor from the potassium sulphate step only for insuring the final conversion and the production of high grade glaserite. While two stages of counter current digestion are generally ample, more may be employed if conditions warrant.

A similar counter current digestion system may be employed in the case of the first step of the process, wherein glaserite is transformed to potassium sulphate. To this end, the potassium sulphate produced as hereinbefore described, may be treated advantageously with a solution essentially saturated with potassium chloride, thereby converting any undecomposed glaserite into potassium sulphate. All or a portion of the KCl employed for converting the glaserite to potassium sulphate may be dissolved in the major portion of the water needed in said step, so as to produce a solution almost saturated with respect to KCl (about 95% saturated). After treating the first precipitated potassium sulphate with said KCl solution, the same is separated from the solids and employed, together with glaserite (and more KCl, if needed) for the production of potassium sulphate, essentially as hereinbefore described. In this manner it is insured that the potassium sulphate produced for sale will be essentially free of sodium salts, containing as an impurity only that quantity of potassium chloride introduced as occluded liquor. By use of suitable mechanical separation means and good washing of the product, a nearly 100% pure product may be so obtained.

Obviously wash waters originating from the purging of the various salt crops in centrifugal machines, filters, etc., may to advantage, be saved and employed in appropriate places in the process, where the need for water has already been indicated.

While the present invention has been described, in general, as applied to the use of solid reagents, it is understood that suitable solutions may be advantageously utilized, when such solutions fall within the limits of the scope of this invention as hereinbefore fully set forth as to principle and practice.

While the particular processes herein described are well adapted to carry out the objects of the present invention, it is to be understood that various modifications and changes may be made without departing from the principles of the invention, and the invention includes all such modifications and changes as come within the scope of the appended claims.

We claim:

1. A process of manufacturing potassium sulphate which comprises digesting glaserite and potassium chloride in insufficient aqueous solution to separately dissolve the glaserite, while precipitating potassium sulphate.

2. A process of producing potassium sulphate which comprises digesting glaserite and potassium chloride in insufficient aqueous solvent to separately dissolve said glaserite or potassium chloride, while converting the glaserite and potassium chloride to potassium sulphate, and precipitating the potassium sulphate from the aqueous solvent, the proportions of glaserite and potassium chloride and water employed being such as to produce a mother liquor remaining after the completion of the conversion operation, which mother liquor is substantially saturated with glaserite, potassium sulphate and potassium chloride.

3. A process of producing potassium sulphate which comprises digesting glaserite and potassium chloride in an aqueous solvent substantially free of sodium compounds while securing a conversion of glaserite and potassium chloride to potassium sulphate which is precipitated from the solvent, the proportions of solvent, glaserite and potassium chloride being selected so as to produce a mother liquor remaining after the completion of the conversion precipitation of potassium sulphate, which mother liquor is substantially saturated with glaserite, potassium sulphate and potassium chloride.

4. The process of manufacturing potassium sulphate which comprises digesting sodium sulphate and potassium chloride with insufficient aqueous solvent to dissolve either of the ingredients separately while securing a conversion of the sodium sulphate and potassium chloride to glaserite and precipitating the same, digesting the glaserite and additional potassium chloride with insufficient water to dissolve either of said latter constituents separately while securing a conversion thereof to potassium sulphate, and precipitating the latter.

5. A process of manufacturing potassium sulphate which comprises digesting sodium sulphate and potassium chloride with an aqueous solvent insufficient in quantity to dissolve either of said constituents separately, while converting said constituents to glaserite and precipitating the same, digesting the glaserite thus produced with an aqueous solvent in insufficient amount to dissolve said glaserite as such while converting the same to potassium sulphate, then precipitating said potassium sulphate.

6. A process of manufacturing potassium sulphate which comprises digesting sodium sulphate and potassium chloride in an aqueous solvent in proportions so that there is insufficient solvent present to have separately dissolved either constituent, while securing the conversion of said constituents to form glaserite, and precipitating the same, digesting the glaserite with another aqueous solvent substantially free of sodium compounds, likewise digesting the potassium chloride with said solvent, the proportions of glaserite, potassium chloride and aqueous solvent being proportioned so that said glaserite and potassium chloride are converted in part to potassium sulphate which is precipitated from the solvent, while all of the solid glaserite and potassium chloride becomes converted or dissolved and a residual mother liquor is produced which is substantially saturated with glaserite, potassium chloride and potassium sulphate.

7. A process of manufacturing potassium sulphate which comprises digesting in an aqueous solvent glaserite and potassium chloride, the solvent being substantially free of sodium compounds, the proportions of solvent, glaserite and potassium chloride being such that the glaserite and potassium chloride are in part at least converted into potassium sulphate which precipitates from said solvent and the remaining potassium chloride and glaserite substantially entirely dissolved by said solvent, leaving a mother liquor which is substantially saturated in glaserite, potassium chloride and potassium sulphate.

8. The process of producing potassium sulphate which includes digesting sodium sulphate and potassium chloride in water, less water being employed than would be sufficient to dissolve either constituent separately, the proportions of sodium sulphate, potassium chloride and water employed being sufficient as to effect a reaction producing and precipitating glaserite, while dissolving and converting substantially all of the potassium chloride and sodium sulphate and forming a residual liquor which is substantially saturated with glaserite, sodium sulphate and sodium chloride, separating the glaserite from the liquor, digesting the glaserite with potassium chloride and water, the proportions of which are such as to cause a reaction forming potassium sulphate, which is precipitated from the solution, and leaving a residual liquor substantially saturated with respect to glaserite, potassium chloride and potassium sulphate.

9. A process of manufacturing potassium sulphate which comprises, digesting glaserite and potassium chloride with water in such proportion as to form and precipitate potassium sulphate while dissolving substantially all of the glaserite and potassium chloride and forming a residual liquor which is substantially saturated in glaserite, potassium sulphate and potassium chloride, then separating the potassium sulphate from the mother liquor, and adding sodium sulphate thereto to precipitate a part of the potash from said liquor.

10. A process of manufacturing potassium sulphate which comprises digesting glaserite and potassium chloride with water in such proportions as to produce and precipitate potassium sulphate while dissolving substantially all of the glaserite and potassium chloride and producing a residual liquor substantially saturated with glaserite, potassium sulphate and potassium chloride, separating such liquor from the potassium sulphate formed and adding to said liquor sodium sulphate and potassium chloride in such proportions as to secure a conversion of the potassium chloride and sodium sulphate with the formation of glaserite, while bringing into solution substantially all of said potassium chloride and sodium sulphate, and forming a residual liquor substantially saturated with glaserite, sodium sulphate and sodium chloride, and returning the glaserite produced to the first digestion operation.

11. A cyclic process of manufacturing potassium sulphate which comprises digesting glaserite and potassium chloride with water in such proportions as to dissolve substantially all of such ingredients and to precipitate from solution potassium sulphate and produce a residual liquor substantially saturated with respect to glaserite, potassium sulphate and potassium chloride, and then separating said residual liquor from the precipitated potassium sulphate and adding thereto sodium sulphate and potassium chloride in sufficient quantities to produce and precipitate glaserite in said solution in substantially sufficient quantity to supply the glaserite necessary in the first digesting operation, the proportions employed being such that substantially all of the sodium sulphate and potassium chloride is dissolved or converted and a residual liquor is formed after the precipitation of the glaserite which is substantially saturated with glaserite, sodium sulphate and sodium chloride.

12. A process of manufacturing potassium sulphate which comprises digesting glaserite with potassium chloride in insufficient water to dissolve either constituent separately while securing a conversion of the glaserite and potassium chloride to potassium sulphate and precipitating the same from solution, the proportions of water, glaserite and potassium chloride utilized being such as to produce a residual liquor which is substantially saturated with glaserite, potassium chloride and potassium sulphate, and adding sodium sulphate to the residual liquor after the liquor has been separated from the precipitated potassium sulphate, so as to precipitate a potash salt from said liquor.

13. A process of manufacturing potassium sulphate which comprises digesting glaserite and potassium chloride in insufficient water to dissolve either constituent separately while securing a conversion of the glaserite and potassium chloride to precipitate potassium sulphate from the solvent, the proportions of water to glaserite and potassium chloride utilized being such as to cause substantially the entire solution and conversion of the glaserite and potassium chloride and to produce a residual liquor after the potassium sulphate precipitation which is substantially saturated with glaserite, potassium chloride and potassium sulphate, adding sodium sulphate to the residual liquor after the liquor has been separated from the precipitated potassium sulphate, thereby to precipitate the potash salt from said liquor, and utilizing said potash salt in the first operation.

14. A process of manufacturing potassium sulphate, which comprises digesting a sodium sulphate containing material and potassium chloride in water in such proportions as to produce and precipitate glaserite, dissolving all of the added sodium sulphate containing material and potassium chloride while leaving a residual liquor which is substantially saturated with glaserite, sodium sulphate and sodium chloride, separating the glaserite from the liquor, digesting the glaserite with potassium chloride and water in such proportions as to substantially dissolve all of such solid constituents and precipitate potassium sulphate leaving a residual liquor which is substantially saturated with respect to glaserite, potassium chloride and potassium sulphate.

15. A process of manufacturing potassium sulphate, which comprises digesting a sodium sulphate containing material and potassium chloride in water in such proportions as to produce and precipitate glaserite, dissolving all of the added sodium sulphate containing material and potassium chloride while leaving a residual liquor which is substantially saturated with glaserite, sodium sulphate and sodium chloride, separating the glaserite from the liquor, digesting the glaserite with potassium chloride and water in such proportions as to substantially dissolve all of such solid constituents and precipitate potassium sulphate leaving a residual liquor which is substantially saturated with respect to glaserite, potassium chloride and potassium sulphate, and adding sodium sulphate containing material and potassium chloride to the residual liquor to produce and precipitate further glaserite.

CHARLES F. RITCHIE.
GRANT E. WARREN.